(12) United States Patent
Vargas et al.

(10) Patent No.: US 7,693,832 B2
(45) Date of Patent: Apr. 6, 2010

(54) RICH SET OF SYNCHRONIZATION RULES ACROSS MULTIPLE ACCOUNTS WITH MULTIPLE FOLDER AND CONSENT TYPES

(75) Inventors: Garrett R. Vargas, Sammamish, WA (US); Paul B. Tracey, Seattle, WA (US); Sandra I. Vargas, Sammamish, WA (US); Anh P. Tran, Seattle, WA (US); Chad M. Whitney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 11/363,746

(22) Filed: Feb. 28, 2006

(65) Prior Publication Data

US 2007/0203954 A1 Aug. 30, 2007

(51) Int. Cl.
*G06F 17/30* (2006.01)
*G06F 17/00* (2006.01)

(52) U.S. Cl. .................................. 707/3; 707/4; 707/5

(58) Field of Classification Search ................ 707/3–5, 707/203–204
See application file for complete search history.

(56) References Cited

U.S. PATENT DOCUMENTS

| 6,999,469 | B1 | 2/2006 | Chu et al. | |
| 7,035,847 | B2 * | 4/2006 | Brown et al. | 707/4 |
| 7,222,139 | B2 * | 5/2007 | Mau | 707/204 |
| 7,289,983 | B2 * | 10/2007 | Best et al. | 707/3 |
| 7,317,699 | B2 * | 1/2008 | Godfrey et al. | 370/328 |
| 7,320,011 | B2 * | 1/2008 | Koskimies | 707/201 |
| 2004/0181580 | A1 | 9/2004 | Baranshamaje et al. | |

FOREIGN PATENT DOCUMENTS

WO 2004028108 A2 4/2004

OTHER PUBLICATIONS

International Search Report dated Aug. 24, 2007 for PCT Application Serial No. PCT/US2007/004777, 2 Pages.

* cited by examiner

*Primary Examiner*—Yicun Wu
(74) *Attorney, Agent, or Firm*—Woodcock Washburn LLP (57) ABSTRACT

A unique system and method that facilitates synchronizing data across multiple accounts at about the same time is provided. The system and method involve configuring an intelligent set of synchronization rules that can apply to various data types from one or more user accounts or storage locations. In addition, the system or method can leverage off of existing search folders or search queries to configure the synchronization rules.

20 Claims, 11 Drawing Sheets

RICH SET OF SYNCHRONIZATION RULES ACROSS MULTIPLE ACCOUNTS WITH MULTIPLE FOLDER AND CONSENT TYPES

BACKGROUND

Consumers are on average very demanding of their electronic devices. They often desire smaller, more compact dimensions for greater portability and discreteness coupled with more power and more capabilities. Unfortunately, the amount of storage space available on a mobile device compared to a server and the high cost and slower bandwidth of existing cellular data connections tend to make it less feasible or impracticable to store more than a small subset of a user's data on a mobile device. Existing solutions typically address these limitations with simple filters by synchronizing only the most recent data (e.g., last n days) or only a certain amount of each item (e.g., download x bytes) to the device. Alternatively, only certain types of data may be synchronized. In conventional devices, these settings are often fixed and uncontrollable by the user. Thus, the user is restricted to a small subset of information that may in large part lack importance or even interest to the user. Furthermore, the synchronized information may be only a partial amount of the information that the user needs.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that involve defining an intelligent set of synchronization rules to facilitate the sharing of desired information among a plurality of devices. In particular, the synchronization rules can filter various types of data across multiple user accounts, thereby allowing the user to upload and view selected subsets of his/her personal and/or work-related information on his or her mobile device(s). Unlike conventional synchronization schemes, the user can customize or configure synchronization rules to transfer (or copy) data of different types from a plurality of his/her user accounts between devices. This can be accomplished in part by configuring the synchronization rules to include or exclude data according to its type (e.g., email, voice message, instant message, SMS message, calendar item, note, task, contact, document/file, etc.), content, source (e.g., account or storage location (SIM card)), priority (e.g., high, low, or normal), state (e.g., read, unread, open, private, or archived), and/or category (e.g., personal, business, client, kids, entertainment, school, etc.).

Each synchronization rule essentially behaves similar to a search and filter operation. Therefore, existing search folders or queries can be employed as synchronization rules as well. For example, suppose a user performed a search earlier of his/her hard drive to look for any message, document, or file including the phrase "magnetic resonance". Now, the user wishes to transfer copies of the search results to his mobile device for an off-site meeting. Instead of having to recall the search terms again, the user can use the saved search query to configure a synchronization rule so that the "magnetic resonance" data is synchronized onto his mobile device. Alternatively, any stored search results can readily be synchronized with the desired device, thus eliminating further or duplicative machine processing.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with automatically configuring a set of synchronization rules based on previous configurations or user preferences. The user can accept them as they are or modify them as desired or can delete them as well. The synchronization rules can be stored and reused any number of times.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
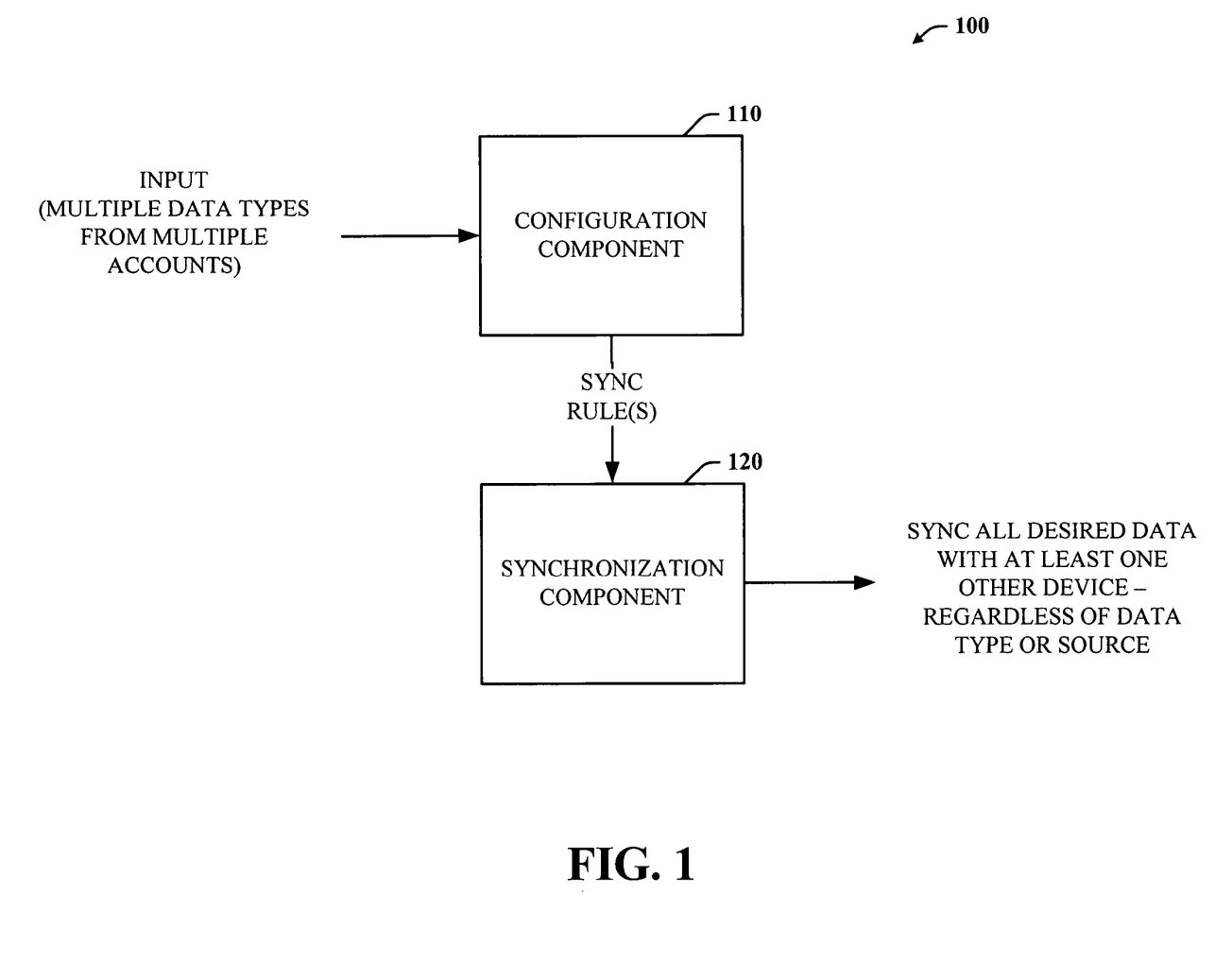
FIG. 1 is a block diagram of a synchronization system that facilitates defining a rich set of synchronization rules across multiple accounts and multiple data types.

Referring now to FIG. 1, there is a general block diagram of a synchronization system 100 that facilitates defining a rich set of synchronization rules across multiple accounts with potentially more than one data type. The system 100 includes a configuration component 110 that can process input of different data types from more than one account in order to configure one or more synchronization rules. Following, one or more synchronization rule(s) can be selected and a synchronization component 120 can synchronize all or substantially all of the desired data with at least one other device. The synchronization system 100 can process or be applied to a plurality of different data types at the same time. Thus, various data types such as emails, calendar items, and photos can be synchronized at or about the same time onto another computing device.

In practice, for example, imagine that the following synchronization rule has been configured by a user: unread messages from yesterday and today and any selected item (appointment, note, document, and message) including the phrase "winter sports trip" in its content. The synchronization component 120 can run this rule across one or more than one source or user account in order to capture and synchronize all of the data that satisfies the synchronization rule. Some users maintain more than one account for email, contacts, notes, appointments, documents, and the like—particularly on their desktop or primary computer where memory and processing power are virtually without limits. However, the smaller, portable devices such as laptops, PDAs, smart phones, and pocket PCs may have lesser amounts of (at least) storage capacity. Hence, when away from his/her primary computer, a user is more likely to rely on a portable device for the most pertinent information he/she needs at a given time. This can be accomplished in part by synchronizing the user's most desired information regardless of type or source to his/her portable device at about the same time using such synchronization rules that can access multiple sources if necessary to collect the desired data.

Referring again to the exemplary synchronization rule above, suppose that the user maintains 3 accounts—each with email and contacts and one also with stored documents and a calendar. The synchronization component 120 can filter through the data of each account in order to "grab" any data that satisfies the conditions of the rule. Conventional synchronization schemes tend to be more rigid in dictating the kinds and amounts of information that can be synchronized between devices; and thus such schemes lack the flexibility described in the subject application.

It should be appreciated that the synchronization rules can be applied in a bi-directional manner such that the selected information is copied or uploaded between the desired devices. Therefore, selected information can be transferred or copied from a primary computing device to a portable device and vice versa. For the sake of brevity, the application will be discussed with respect to synchronizing data from the main computer to a mobile or portable device. However, the reverse can be performed as well and such is contemplated to fall within the scope of the application.

Figure 2:
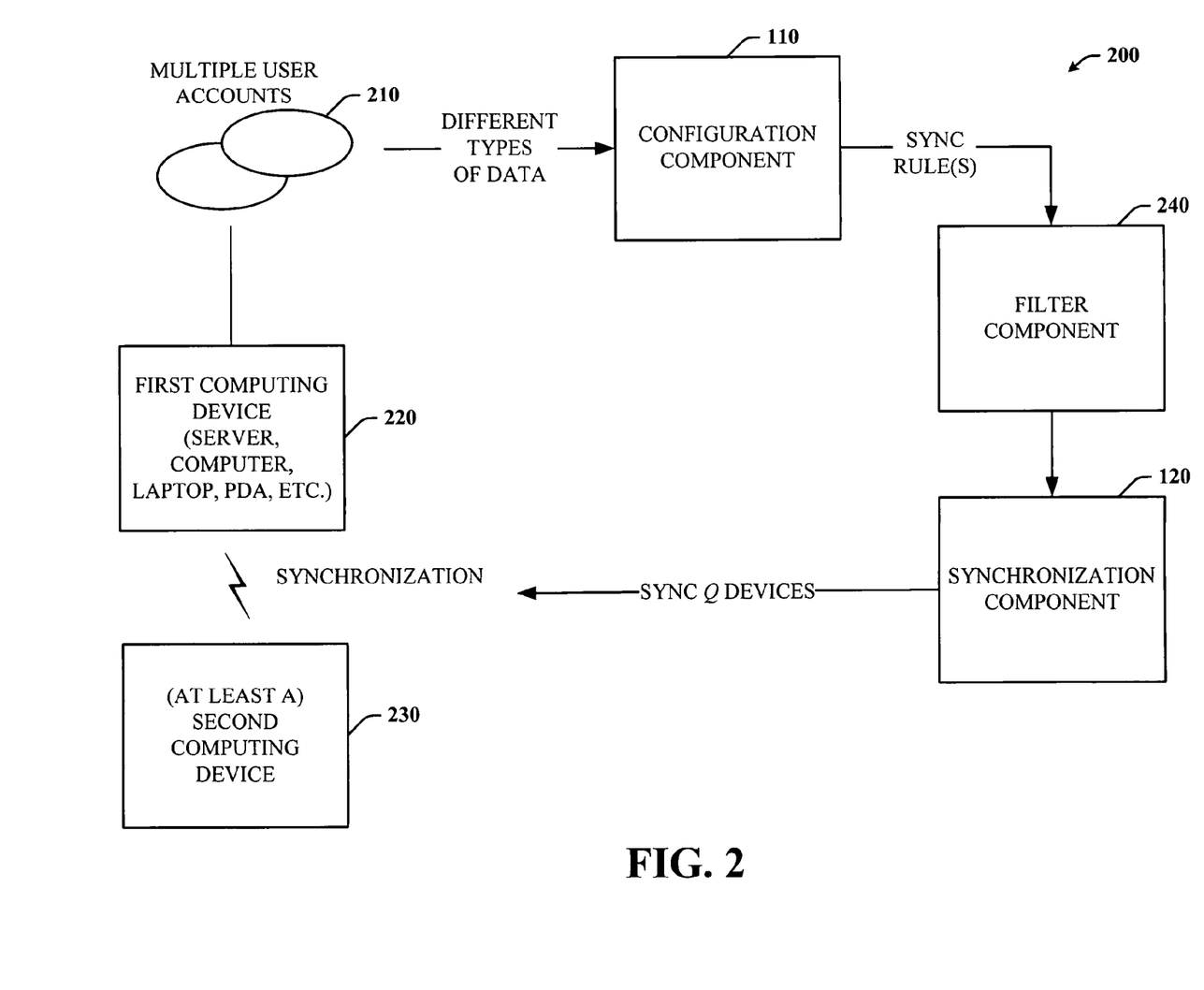
FIG. 2 is a block diagram of a synchronization system that facilitates defining a rich set of synchronization rules across multiple accounts and multiple data types between at least two computing devices.

Turning now to FIG. 2, there is a block diagram of a synchronization system 200 that facilitates defining a rich set of synchronization rules across multiple accounts 210 and multiple data types to synchronize data between at least two computing devices (220, 230). The system 200 includes a configuration component 110 that defines the one or more synchronization rules. As previously mentioned, the synchronization rules can be applied to a plurality of user accounts 210 as desired by the user. For example, the user can indicate the accounts 210 from which data can be obtained such as the HM and office accounts. Alternatively, the user can choose all accounts except the home account or some other variation.

Each account may contain many different types of data such as an address book, notes, messages, task items, calendar entries, word processing documents, pictures, and voice files. The synchronization rules can be applied across these different data types as well. A filter component 240 can determine whether at least a subset of the data satisfies the conditions of the rule and then filter the data accordingly. More specifically, the filter component 240 can accomplish this in part by analyzing the data for at least one of source, data type, content, and/or state of the data. In addition, the order of the analysis can be dictated by the system or the user. For instance, if only the data located in a certain account or storage location is desired for synchronization, then the data may be initially filtered by source in order to exclude any non-selected sources. This can be particularly helpful when it is important for a user to keep certain information from being copied or transferred to other devices for privacy or confidentiality reasons.

Figure 3:
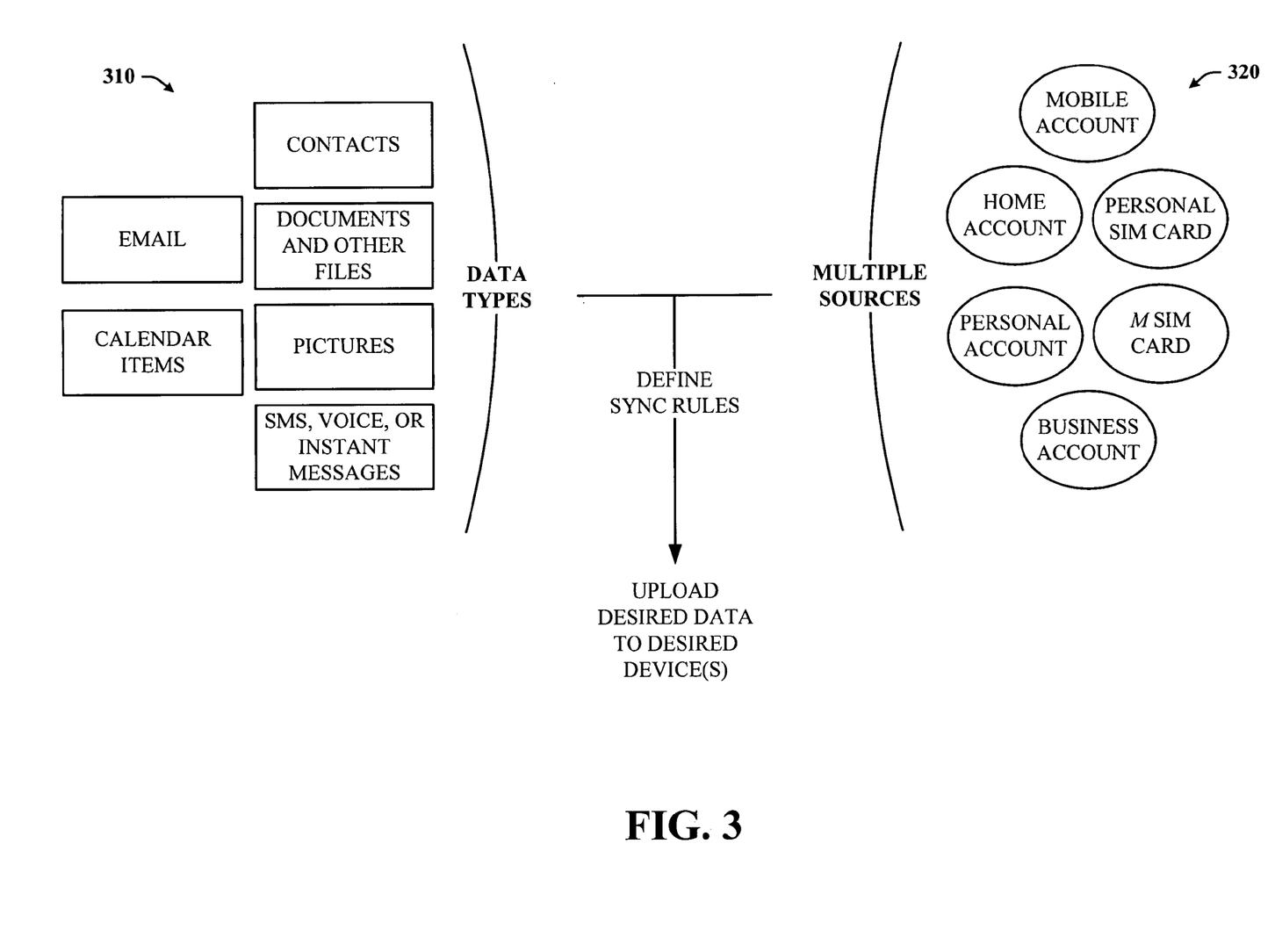
FIG. 3 is a block diagram of exemplary data types and sources or accounts that can be employed when configuring one or more synchronization rules.

Referring now to FIG. 3, there is a block diagram of exemplary data types 310 and data sources 320 that can be accessed and employed when configuring one or more synchronization rules. The data types can include, but are not limited to email, calendar items, contacts, pictures, SMS messages, voice messages, instant messages, documents, spreadsheets, and/or other files. Any of these data types can be subjected to the synchronization rules depending on the conditions of the rules. For example, one rule may include only certain data types whereas another rule may not designate a data type. Therefore, any data regardless of its type that satisfies the other conditions of the rule can be filtered and synchronized to another device.

Similarly, any available account or storage location can be accessed for its data. Instead of having to apply or configure separate synchronization rules for each account, these rules can be universally applied to any available account. In some cases, the account may need to be activated by the user (e.g., logged on) before acquiring any data therefrom. If a particular account is selected for synchronization but is not activated, a notification can be sent to the user such as by a pop-up message or window. Alternatively, an error message may appear rather than a "no data found" message so that the user is aware of the problem. Examples of the types of accounts or storage locations include but are not limited to a mobile account (e.g., having some friends, some family, or some business data), home account (e.g., family data), business account, personal SIM card, or any other SIM cards (e.g., M SIM card, where M is an integer greater than one).

Figure 4:
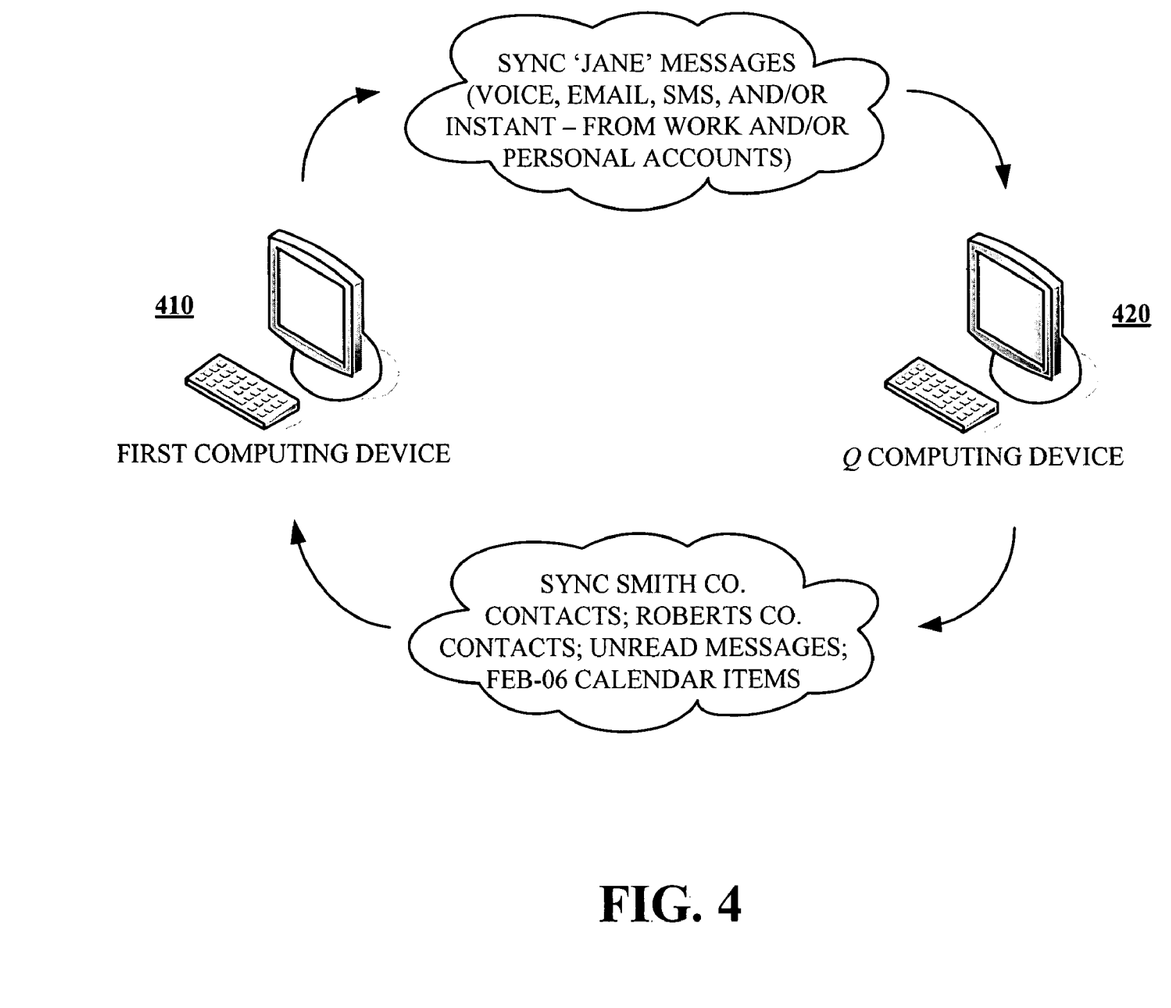
FIG. 4 is a schematic diagram that demonstrates the synchronization of a plurality of data types across multiple accounts between at least two devices.

Referring now to FIG. 4, there is a schematic diagram that demonstrates the synchronization of a plurality of data types across multiple accounts between at least two devices. In particular, information can be passed between a first computing device 410 and Q computing devices 420 where Q is an integer greater than one. For example, a user can synchronize Jane messages such as voice, email, SMS and/or instant messages from work and/or personal accounts from a first computing device 410 to at least one other computing device 420. Likewise, contacts for Smith Co. and Roberts Co.; unread messages; and February 2006 calendar items can be synchronized from the Q computing device 420 to the first computing device 410.

Figure 5:
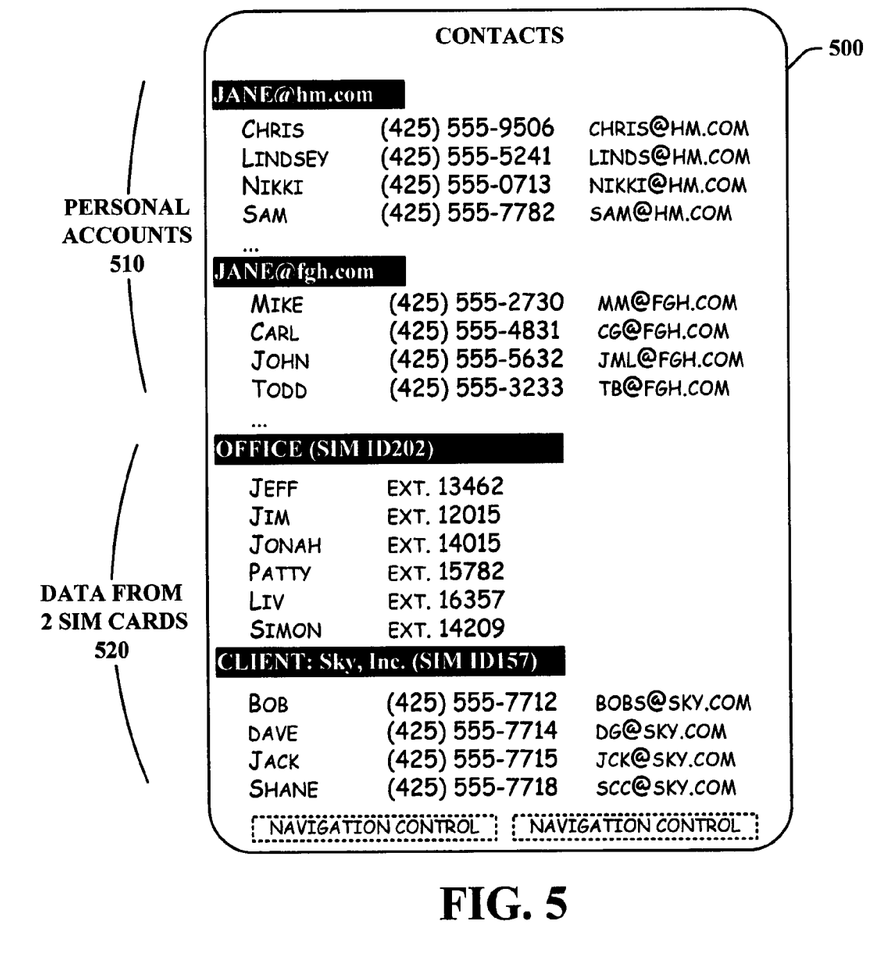
FIG. 5 illustrates an exemplary user interface on a computing device for contact data synchronized from multiple accounts.

To organize and view the synchronized information, various user interfaces can be employed. FIG. 5 demonstrates an exemplary user interface 500 that may exist on a portable computing device for contact data which has been synchronized from multiple accounts such as personal accounts 510 and different storage locations 520 (e.g., SIM cards). For example, the data can be organized by account or source as shown. Various navigation controls can also be employed to manipulate the view of the data and to view other types of data.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 6:
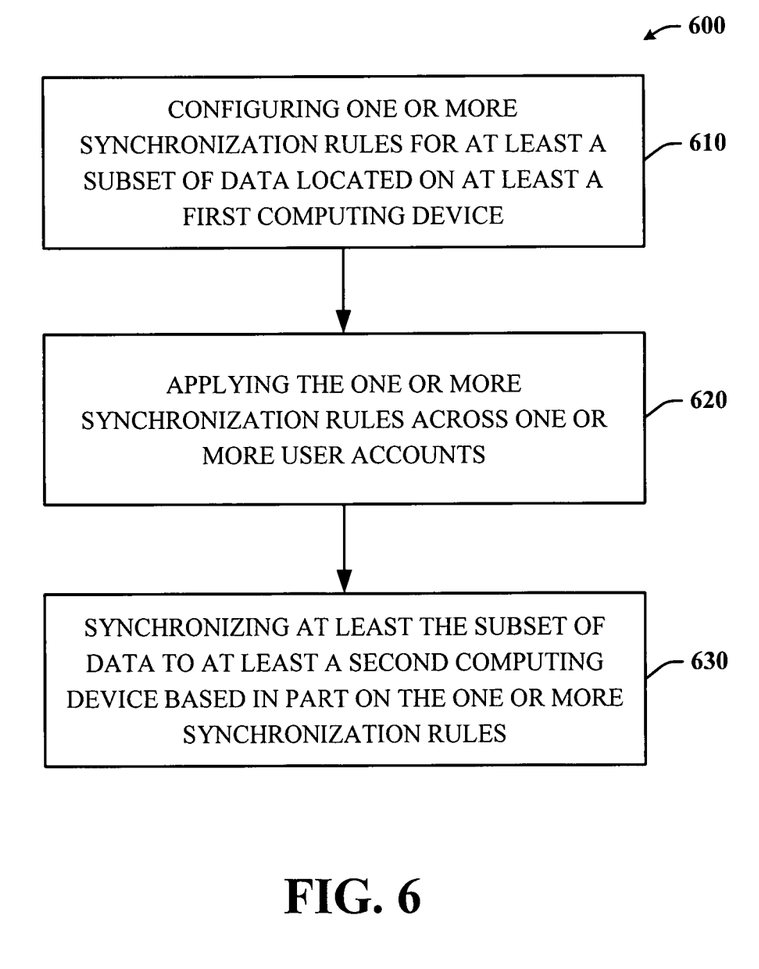
FIG. 6 is a flow diagram illustrating an exemplary methodology that facilitates synchronizing various data types from multiple accounts between computing devices.

Turning to FIG. 6, there is a flow diagram illustrating an exemplary methodology 600 that facilitates synchronizing various data types from multiple accounts between computing devices. The method 600 involves configuring one or more synchronization rules at 610 that correspond to at least a subset of data and/or data types that can be applied across one or more user accounts (at 620) which are located on at least a first computing device. The first computing device may be a desktop computer, server, laptop, smart phone, or PDA. By defining the synchronization rules to encompass more than one data type and a plurality of user accounts, synchronizing the data can be performed in a more consistent and efficient manner. At 630, any data that satisfies the synchronization rules can be synchronized to at least a second computing device.

Figure 7:
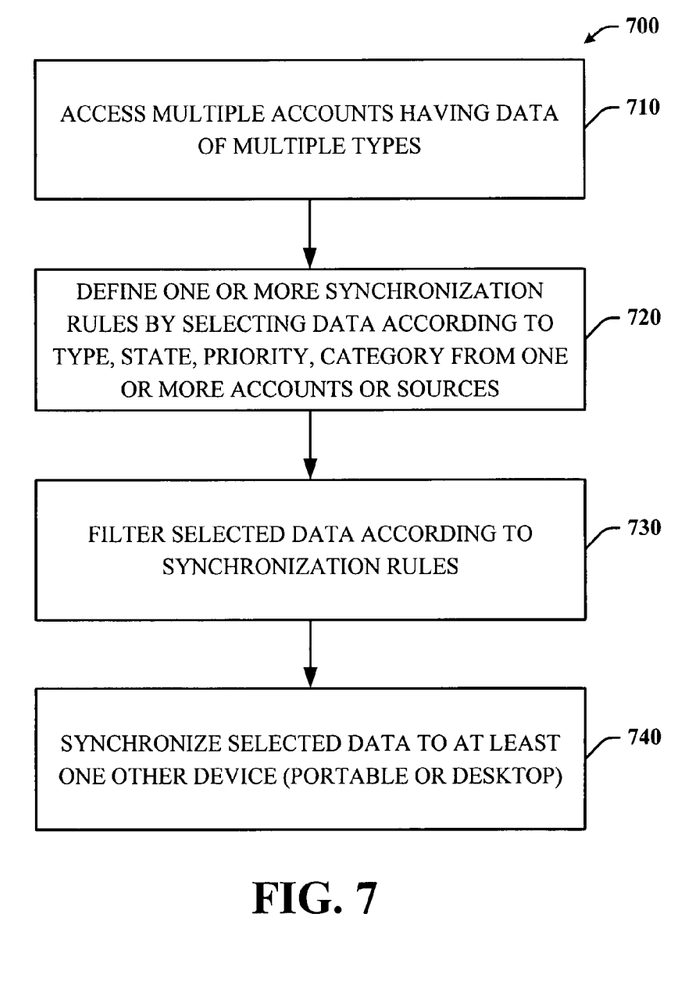
FIG. 7 is a flow diagram illustrating an exemplary methodology that facilitates selecting and synchronizing various data types from multiple accounts between computing devices.

Turning now to FIG. 7, there is a flow diagram illustrating an exemplary methodology 700 that facilitates selecting and synchronizing various data types from multiple accounts between computing devices. The method 700 involves accessing multiple accounts with multiple data types at 710 and defining one or more synchronization rules by selecting at least a subset of data according to type, state, priority, category from one or more accounts or sources at 720. At 730, the selected data can be filtered according to the selected synchronization rules and then synchronized with at least one other device at 740.

Figure 8:
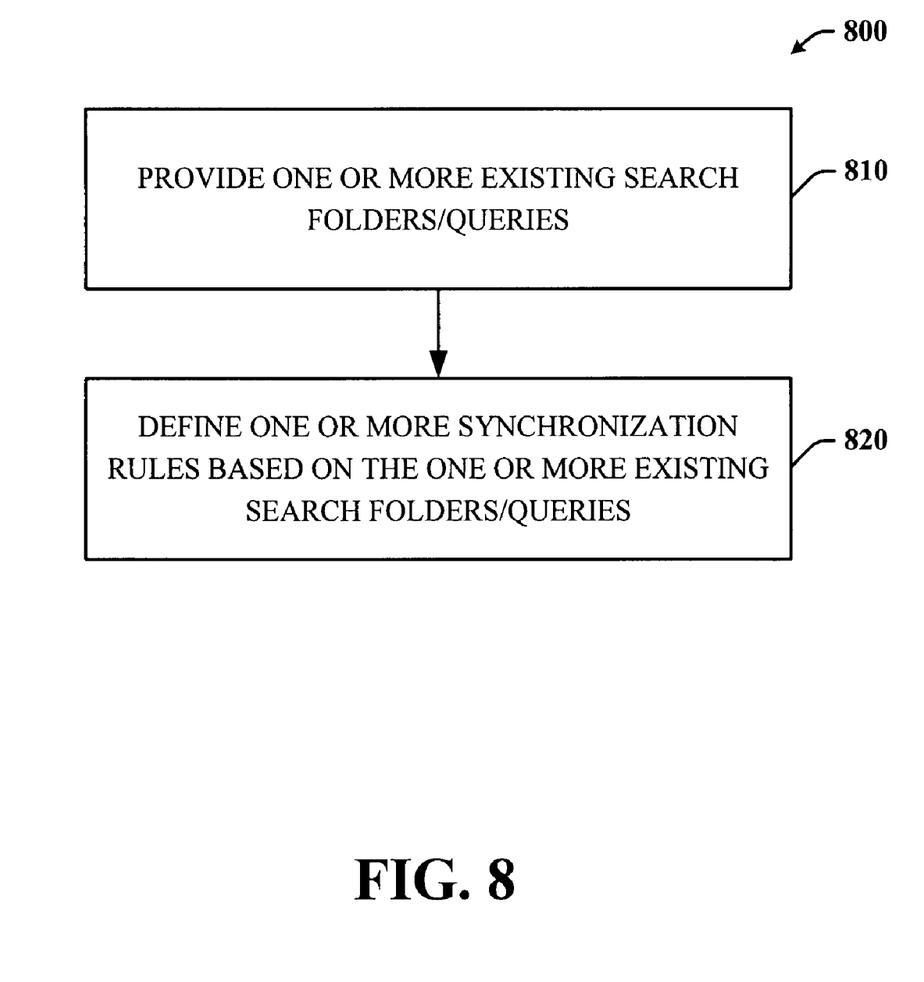
FIG. 8 is a flow diagram illustrating an exemplary methodology that facilitates leveraging off of existing search folders or queries to configure one or more synchronization rules.

In FIG. 8, there is a flow diagram illustrating an exemplary methodology 800 that facilitates leveraging off of existing search folders or queries to configure one or more synchronization rules. The method 800 involves providing one or more existing search folders or queries at 810. These existing search folders or queries may have been created to perform previous filtering operations on the device. To save the user time, the pre-existing search folders can be employed to configure one or more synchronization rules at 820. It should be understood that the synchronization rules can be saved for later use and/or selectively turned on or off depending on what information the user wishes to synchronize. Similarly, they can be modified or deleted. Because search folders, particularly those created by the user, can be employed to view a filtered set of data within desktop applications like messaging and word processing, this will ensure the user has a consistent view of those items that are important to them on the device.

Figure 9:
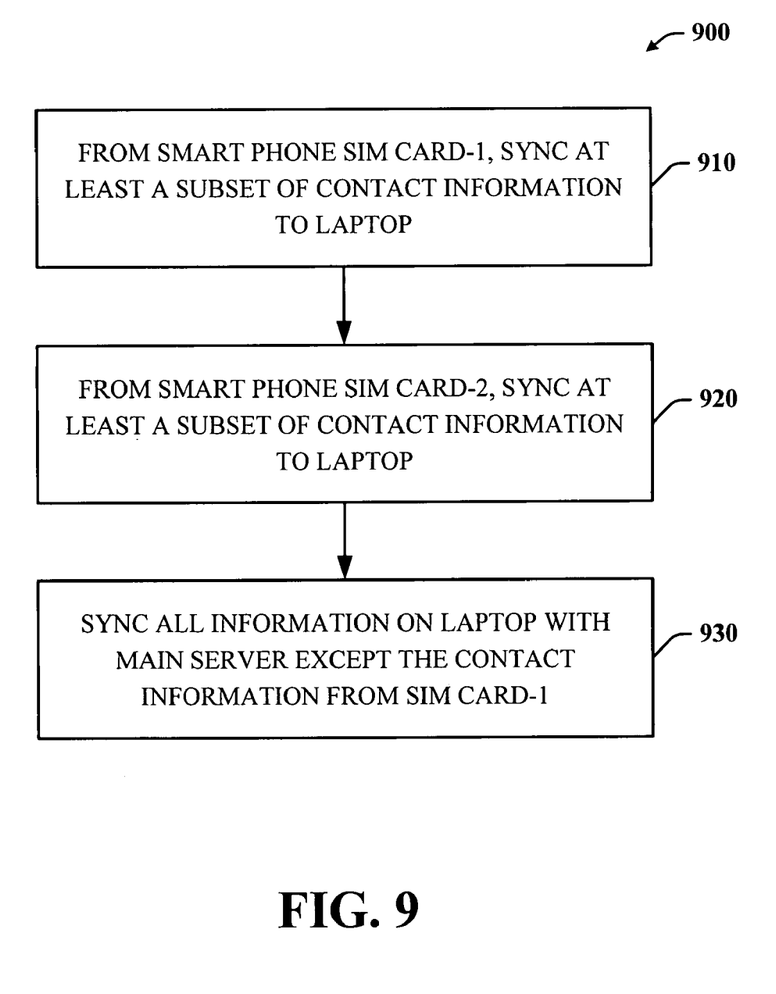
FIG. 9 is a flow diagram illustrating an exemplary synchronization scenario involving synchronizing data from different sources (SIM cards) in a selective manner between a smart phone and a laptop and between a laptop and a server.
Figure 10:
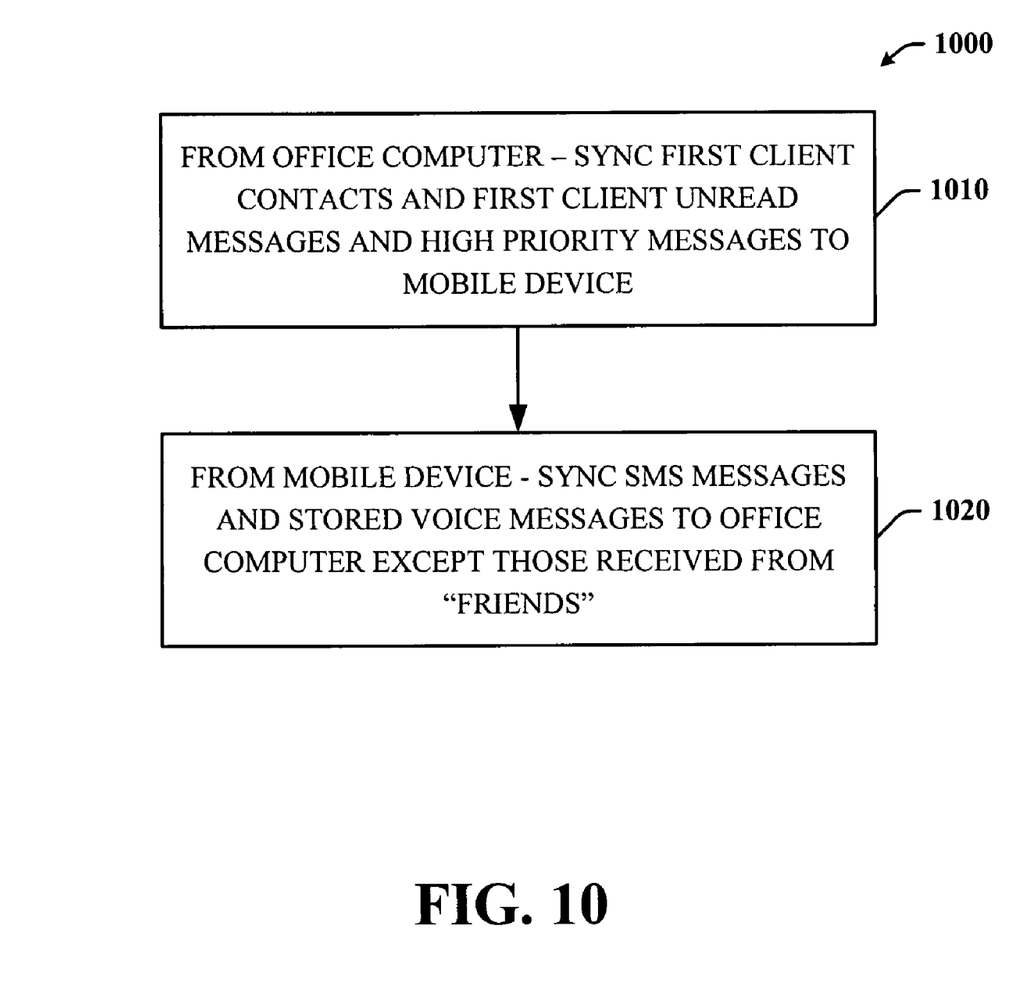
FIG. 10 is a flow diagram illustrating an exemplary synchronization scenario involving synchronizing data between a mobile phone and a desktop computer.

FIGS. 9 and 10 depict exemplary synchronization scenarios. In FIG. 9, the scenario 900 involves synchronizing data from different sources (SIM cards) in a selective manner between a smart phone and a laptop and between a laptop and a server. In particular, a subset of contact information located on SIM card-1 for a smart phone can be synchronized at 910 to a laptop computer. At 920, a subset of contact information from SIM card-2 for the same smart phone can be synchronized to the laptop computer as well. At 930, all of the contact information on the laptop except the SIM card-1 information can be synchronized to a server.

The scenario 1000 in FIG. 10 involves synchronizing data between a mobile phone and a desktop computer. For example, in addition to any high priority messages on the user's office computer, a first client's contacts and unread messages from the first client can be filtered and synchronized to the user's mobile phone at 1010. At 1020, any SMS messages except those from Friends and saved voice messages except those from Friends can be transferred from the smartphone to the office computer. By defining synchronization rules in this manner, the user can keep any personal information separate from work related matters.

Figure 11:
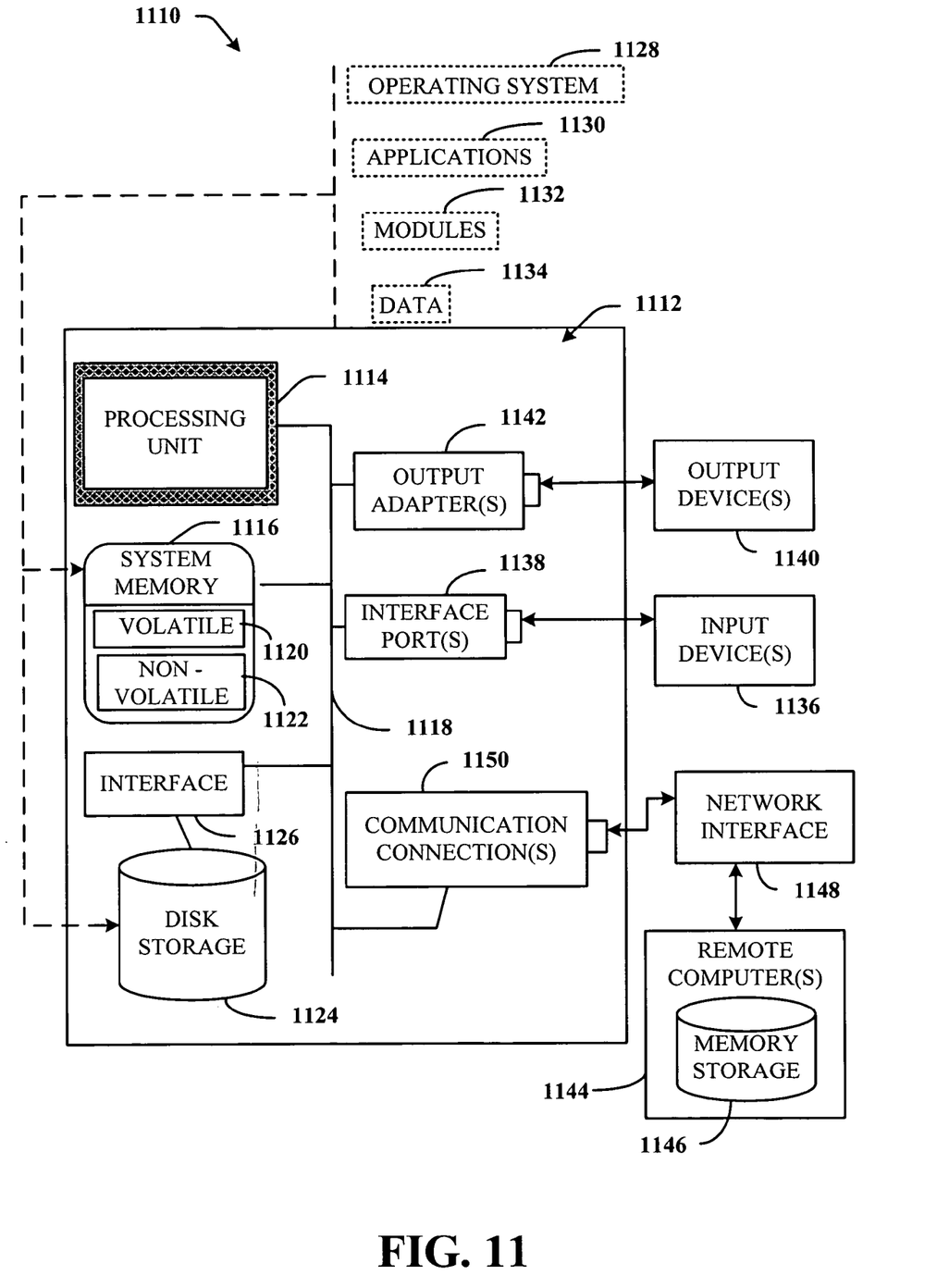
FIG. 11 illustrates an exemplary environment for implementing various aspects of the invention.

In order to provide additional context for various aspects of the subject invention, FIG. 11 and the following discussion are intended to provide a brief, general description of a suitable operating environment 1110 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates selectively transferring desired data from multiple user accounts between computing devices, the system comprises a processor for executing the following components:
a configuration component that configures one or more synchronization rules based on user preferences and inference schemes for at least a subset of data of multiple data types, each data type associated with a respective application, from one or more user accounts located on at least a first computing device, wherein the configuration component configures the synchronization rules by analyzing at least one pre-defined search folder to determine filtering information associated with each of the at least one pre-defined search folder;
a synchronization component that synchronizes at least the subset of data to at least a second computing device based in part on the one or more synchronization rules, which are applied in a bi-directional manner; and
a search storage component that stores search folders and previous search queries performed on the first computing device, wherein the stored search folders and search queries are employed to configure the one or more synchronization rules; and
wherein the one or more synchronization rules are stored for subsequent use, and are selectively turned on or off depending on the subset of the data to be synchronized.

2. The system of claim 1 further comprises a filter component that filters at least the subset of data according to the one or more synchronizations rules across the multiple user accounts for synchronization to one or more desired computing devices.

3. The system of claim 2, wherein the filter component filters at least the subset of data in part by analyzing the data for at least one of source, data type, storage location, content, and state of the data.

4. The system of claim 3, wherein the state of the data comprises at least one of a priority state, a flag state, a private/public state, and an unread/read state.

5. The system of claim 1, wherein the synchronization component synchronizes the data from the one or more user accounts at the same time, whereby the data comprises one or more different data types.

6. The system of claim 1, wherein the first and second computing devices comprises any one of a desktop computer, laptop, PDA, smart phone, tablet PC, or server.

7. The system of claim 1, wherein the multiple user accounts comprise one or more email accounts, one or more instant messaging accounts, one or more device accounts, one or more SIM cards, and one or more SMS accounts.

8. A method implemented by a computer processor that facilitates selectively transferring desired data from multiple user accounts between computing devices comprising:
configuring one or more synchronization rules based on user preferences and inference schemes for at least a subset of data of multiple data types located on at least a first computing device;
employing one or more existing search folders and existing search queries to configure the one or more selectively rules, where those existing search folder and queries are stored on the desktop or sever that the first computing device is synchronizing with by analyzing the one or more search folder and existing queries to determine filtering information;
selectively applying the one or more synchronization rules across one or more user accounts;
synchronizing at least the subset of data to at least a second computing device based in part on the one or more synchronization rules;
applying the one or more synchronization rules in a bi-directional manner such that the subset of data is copied and uploaded between the first and second computing devices; and
storing the one or more synchronization rules for subsequent use, and selectively turning on or off, or modifying or deleting the one or more synchronization rules depending on the subset of the data to be synchronized.

9. The method of claim 8 further comprises filtering the data based in part on the one or more synchronization rules.

10. The method of claim 9, wherein filtering the data comprises analyzing the data for at least one of source, data type, state, category, storage location, and content.

11. The method of claim 9, wherein the data is filtered across multiple user accounts at the same time to facilitate synchronization of the data.

12. The method of claim 8, wherein configuring the one or more synchronization rules comprises selecting one or more conditions corresponding to characteristics of the data.

13. The method of claim 8 further comprises organizing synchronized data by at least one of the following: source, originating device, and synchronization date for convenient viewing.

14. The method of claim 8 further comprises providing a notification when at least one user account selected for synchronization is inaccessible for data retrieval.

15. A system, comprising a processor, that facilitates selectively transferring desired data from multiple user accounts between computing devices:
means for configuring one or more synchronization rules based on user preferences and inference schemes for at least a subset of data of multiple data types from one or more user accounts located on at least a first computing device by analyzing at least one pre-defined search folder to determine filtering information; and
means for synchronizing at least the subset of data to at least a second computing device based in part on the one or more synchronization rules;
means for applying the one or more synchronization rules in a bi-directional manner such that the subset of data is copied and uploaded between the first and second computing devices; and
means for employing one or more existing search folders and existing search queries to configure the one or more synchronization rules, where the existing search folders and queries are stored on the desktop or server that the first computing device is synchronizing with.

16. The system of claim 15 further comprises means for filtering at least the subset of data according to the one or more synchronizations rules across the multiple user accounts in part by analyzing the data for at least one of source, data type, storage location, content, and/or state of the data.

17. The system of claim 15, wherein the data is synchronized from the one or more user accounts at the same time.

18. The system of claim 1, wherein the subset of data is copied and uploaded between the first and second computing devices.

19. The system of claim 1, wherein the synchronization component employs pre-existing search folders to configure the one or more synchronization rules.

20. The system of claim 19, wherein the pre-existing search folders are created to perform previous filtering operations on the first computing device.

* * * * *